United States Patent
Xu et al.

(10) Patent No.: US 10,098,058 B2
(45) Date of Patent: Oct. 9, 2018

(54) METHOD AND APPARATUS OF TRANSMITTING DISCOVERY SIGNAL, METHOD AND APPARATUS OF DISCOVERING CELL

(71) Applicant: CHINA ACADEMY OF TELECOMMUNICATIONS TECHNOLOGY, Beijing (CN)

(72) Inventors: Weijie Xu, Beijing (CN); Xueming Pan, Beijing (CN); Zukang Shen, Beijing (CN)

(73) Assignee: China Academy Of Telecommunications Technology, Beijing (CN)

( * ) Notice: Subject to any disclaimer, the term of this patent is extended or adjusted under 35 U.S.C. 154(b) by 18 days.

(21) Appl. No.: 15/327,622

(22) PCT Filed: Jul. 30, 2015

(86) PCT No.: PCT/CN2015/085578
§ 371 (c)(1),
(2) Date: Jan. 19, 2017

(87) PCT Pub. No.: WO2016/041415
PCT Pub. Date: Mar. 24, 2016

(65) Prior Publication Data
US 2017/0188294 A1 Jun. 29, 2017

(30) Foreign Application Priority Data
Sep. 19, 2014 (CN) .......................... 2014 1 0484626

(51) Int. Cl.
*H04W 72/12* (2009.01)
*H04W 48/16* (2009.01)
(Continued)

(52) U.S. Cl.
CPC .......... *H04W 48/16* (2013.01); *H04W 24/08* (2013.01); *H04W 72/04* (2013.01); *H04W 72/042* (2013.01)

(58) Field of Classification Search
CPC ... H04W 48/16; H04W 72/042; H04W 24/08; H04W 72/04
See application file for complete search history.

(56) References Cited

U.S. PATENT DOCUMENTS

2014/0010089 A1 1/2014 Cai et al.
2014/0148191 A1* 5/2014 Feng ................. H04W 72/1215
455/454

(Continued)

FOREIGN PATENT DOCUMENTS

CN 101179778 A 5/2008
CN 101778435 A 7/2010
(Continued)

OTHER PUBLICATIONS

International Search Report for PCT/CN2015/085578 dated Oct. 29, 2015 and its English translation provided by WIPO.

(Continued)

*Primary Examiner* — Lakeram Jangbahadur
(74) *Attorney, Agent, or Firm* — Ladas & Parry, LLP

(57) ABSTRACT

The method of transmitting a discovery signal according to an embodiment of the present disclosure includes: determining whether a channel in an unlicensed frequency band is idle; transmitting the discovery signal in the channel in the unlicensed frequency band during a current cycle of a discovery signal transmission period if the channel in the unlicensed frequency band is determined to be idle; and not transmitting the discovery signal in the channel in the
(Continued)

unlicensed frequency band during the current cycle if the channel in the unlicensed frequency band is determined to be not idle.

17 Claims, 3 Drawing Sheets

(51) Int. Cl.
*H04W 72/04* (2009.01)
*H04W 24/08* (2009.01)

(56) References Cited

U.S. PATENT DOCUMENTS

| | | |
|---|---|---|
| 2015/0365868 A1 | 12/2015 | Chang et al. |
| 2017/0094681 A1* | 3/2017 | Takeda .................. H04W 16/14 |
| 2017/0111889 A1* | 4/2017 | Li ........................ H04W 72/042 |

FOREIGN PATENT DOCUMENTS

| | | |
|---|---|---|
| CN | 102917456 A | 2/2013 |
| CN | 103686746 A | 3/2014 |
| JP | 2013/121091 A | 6/2013 |
| WO | 2013/155672 A1 | 10/2013 |
| WO | 2014/112595 A1 | 7/2014 |

OTHER PUBLICATIONS

Written Opinion of the International Search Authority for PCT/CN2015/085578 dated Oct. 29, 2015 and its machine English translation from Bing.com translator.

International Preliminary Report on Patentability (IPRP; Ch. 1) for PCT/CN2015/085578 dated Mar. 30, 2017 and its English translation provided by WIPO.

From EP Application No. 15842646.0, Supplementary European Search Report and Search Opinion dated Jul. 17, 2017.

From Japanese Application No. 2017-507993, Office Action dated Apr. 10, 2018 with English translation from foreign associate.

Zou et al., "Proximity Discover for Device-to-Device Communications over a Cellular Network", IEEE Communications Magazine, vol. 52, No. 6, Jun. 1, 2014, (pp. 98-107).

* cited by examiner

METHOD AND APPARATUS OF TRANSMITTING DISCOVERY SIGNAL, METHOD AND APPARATUS OF DISCOVERING CELL

CROSS-REFERENCE TO RELATED APPLICATIONS

This application is the U.S. national phase of PCT Application No. PCT/CN2015/085578 filed on Jul. 30, 2015, which claims priority to Chinese Patent Application No. 201410484626.4 filed on Sep. 19, 2014, the disclosures of which are incorporated herein by reference in their entireties.

TECHNICAL FIELD

The present disclosure relates to the field of communication technology, in particular to a method and apparatus of transmitting a discovery signal, and a method and apparatus of discovering a cell.

BACKGROUND

With the development of technology and the explosive growth of data services, more and more low-power base stations such as pico cells and home NodeB stations are deployed to provide small local coverage. This type of base stations may be collectively called as small cells. In wireless communications, the base station uses one single antenna or multiple antennas to achieve wireless signal coverage of a particular area which is also called the cell. The term cell is also usually used to refer to a logical entity that includes base station software and hardware sub-systems that serve user terminals within this particular coverage area. The deploying of small cells not only extends the coverage of macro cells, but also improves the throughputs of the particular area. Generally, the more small cells are deployed in the network, the more users can be served by the small cells and enjoy the performance gains brought by the small cells, so that the overall network throughput is greatly improved. It can be expected that in a real network, a large number of small cells are likely to be densely deployed in geographic areas where service requirements are concentrated.

In the actual deployment scenario of small cells, numerous cells may use separate cell identifications (IDs), or numerous adjacent small cells and/or transmission points (TPs) (hereinafter referred to as small cell/TP) share the same cell ID. Since the number of user equipments (UEs) served by one single small cell/TP is small, the service load of the single small cell/TP fluctuates a lot during different time periods. In order to save energy and reduce the interference to other small cells/TPs, the small cell on/off technology may be used to turn on or off the small cell/TP based on the actual service situation when small cell/TP has no service to be transmitted. The small cell/TP is required to periodically transmit the discovery signal in order for the UE to discover the turned-off small cell/TP so that the small cell/TP that has been turned off may be turned on when the UE has services to be transmitted.

Currently, cellular communication networks use licensed spectrum resources to carry out network deployment and service transmission. That is, the small cells/TPs periodically transmit the discovery signal in the licensed spectrum resources. However, with the increase in the number of base stations and the growing shortage of spectrum resources, there may be no spectral resources to be allocated for the discovery signal or strong interference caused by sending the discovery signal.

SUMMARY

(I) Technical Problem to be Solved

The present disclosure aims to provide a method and apparatus of transmitting a discovery signal as well as a method and apparatus of discovering a cell, so as to address the problems caused by the strain on the licensed spectrum resource.

(II) Technical Solutions

The objectives of the present disclosure are realized by the following technical solutions:

According to a first aspect, provided is that a method of transmitting a discovery signal, which includes: determining whether a channel in an unlicensed frequency band is idle; transmitting the discovery signal in the channel in the unlicensed frequency band during a current cycle of a discovery signal transmission period if the channel in the unlicensed frequency band is determined to be idle; and not transmitting the discovery signal in the channel in the unlicensed frequency band during the current cycle if the channel in the unlicensed frequency band is determined to be not idle.

In one possible embodiment, the determining whether the channel in the unlicensed frequency band is idle includes: measuring the channel in the unlicensed frequency band in a preset time period before the current cycle of the discovery signal transmission period; and determining based on a measurement result whether the channel in the unlicensed frequency band is idle.

In one possible embodiment, the determining whether the channel in the unlicensed frequency band is idle includes: determining whether the channel in the unlicensed frequency band is idle, based on a received power of the channel in the unlicensed frequency band.

In one possible embodiment, the determining whether the channel in the unlicensed frequency band is idle based on the received power of the channel in the unlicensed frequency band includes: determining whether the channel in the unlicensed frequency band is idle, by comparing a total received power of the channel in the unlicensed frequency band with a first threshold. If the total received power is above the first threshold, the channel in the unlicensed frequency band is not idle; otherwise, the channel in the unlicensed frequency band is idle.

In one possible embodiment, the determining whether the channel in the unlicensed frequency band is idle based on the received power of the channel in the unlicensed frequency band includes: determining whether the channel in the unlicensed frequency band is idle, by comparing a received power of a non-LTE signal in the channel in the unlicensed frequency band with a second threshold. If the received power of the non-LTE signal is above the second threshold, the channel in the unlicensed frequency band is not idle; otherwise, the channel in the unlicensed frequency band is idle.

In one possible embodiment, the determining whether the channel in the unlicensed frequency band is idle based on the received power of the channel in the unlicensed frequency band includes: determining whether the channel in the unlicensed frequency band is idle, by comparing a received power of an LTE signal in the channel in the unlicensed frequency band with a third threshold. If the received power of the LTE signal is above the third threshold, the channel in the unlicensed frequency band is idle; otherwise, the channel in the unlicensed frequency band is not idle.

In one possible embodiment, the determining whether the channel in the unlicensed frequency band is idle based on the received power of the channel in the unlicensed frequency band includes: determining whether the channel in the unlicensed frequency band is idle, by comparing a received power of a signal of an operator other than a present operator in the channel in the unlicensed frequency band with a fourth threshold. If the received power of the signal of the operator other than the present operator is above the fourth threshold, the channel in the unlicensed frequency band is not idle; otherwise, the channel in the unlicensed frequency band is idle.

In one possible embodiment, the determining whether the channel in the unlicensed frequency band is idle based on the received power of the channel in the unlicensed frequency band includes: determining whether the channel in the unlicensed frequency band is idle, by comparing a received power of an LTE signal of an operator other than the present operator in the channel in the unlicensed frequency band with a fifth threshold. If the received power of the LTE signal of the operator other than the present operator is above the fifth threshold, the channel in the unlicensed frequency band is not idle; otherwise, the channel in the unlicensed frequency band is idle.

In one possible embodiment, the method further includes: transmitting discovery signal indication information which indicates whether there is a discovery signal transmitted in the channel in the unlicensed frequency band.

In one possible embodiment, the transmitting the discovery signal indication information includes: transmitting the discovery signal indication information through downlink control information (DCI) in the channel in the licensed frequency band.

In one possible embodiment, the transmitting the discovery signal indication information includes: transmitting the discovery signal indication information in a first available downlink subframe in the current cycle of the discovery signal transmission period.

In one possible embodiment, the discovery signal indication information is configured to indicate whether there is a discovery signal transmitted in the channel at one or more frequency points in the unlicensed frequency band; or the discovery signal indication information is configured to indicate whether at least one cell transmits a discovery signal in the channel in the unlicensed frequency band.

According to a second aspect, provided is the a method of discovering a cell, which includes: receiving a discovery signal in a channel in an unlicensed frequency band, wherein the discovery signal is transmitted when a base station determines that the channel in the unlicensed frequency band is idle; and discovering a cell of the base station based on the discovery signal.

In one possible embodiment, the receiving the discovery signal in the channel in the unlicensed frequency band includes: receiving discovery signal indication information which indicates whether there is a discovery signal transmitted in the channel in the unlicensed frequency band; and receiving the discovery signal in the channel in the unlicensed frequency band if the discovery signal indication information indicates there is a discovery signal transmitted in the channel in the unlicensed frequency band.

In one possible embodiment, the receiving the discovery signal indication information includes: receiving the discovery signal indication information through downlink control information (DCI) in the channel in the licensed frequency band.

In one possible embodiment, the receiving the discovery signal indication information includes: receiving the discovery signal indication information in a first available downlink subframe in a current cycle of a discovery signal transmission period.

In one possible embodiment, the receiving the discovery signal in the channel in the unlicensed frequency band includes: receiving the discovery signals of each cell in the channel at the frequency point indicated by the discovery signal indication information in the unlicensed frequency band, and the discovery signal indication information indicates there is a discovery signal transmitted in the channel at one or more frequency points in the unlicensed frequency band; or receiving the discovery signal transmitted in the channel in the unlicensed frequency band in a cell indicated by the discovery signal indication information which is used to indicate whether at least one cell transmits the discovery signal in the channel in the unlicensed frequency band.

In one possible embodiment, the receiving the discovery signal in the channel in the unlicensed frequency band includes, if no discovery signal indication information is received: blind-detecting the discovery signal in the channel in the unlicensed frequency band at a known transmission time of the discovery signal.

Based on the same inventive concept as the method, according to a third aspect, the embodiments of the present disclosure further provide an apparatus of transmitting a discovery signal, which includes: a channel state determining module and a discovery signal transmitting module. The channel state determining module is configured to determine whether a channel in an unlicensed frequency band is idle. The discovery signal transmitting module is configured to transmit the discovery signal in the channel in the unlicensed frequency band during a current cycle of a discovery signal transmission period if the channel in the unlicensed frequency band is determined to be idle; and configured not to transmit the discovery signal in the channel in the unlicensed frequency band during the current cycle if the channel in the unlicensed frequency band is determined to be not idle.

In one possible embodiment, the channel state determining module is specifically configured to: measure the channel in the unlicensed frequency band in a preset time period before the current cycle of the discovery signal transmission period; and determine based on a measurement result whether the channel in the unlicensed frequency band is idle.

In one possible embodiment, the channel state determining module is specifically configured to: determine whether the channel in the unlicensed frequency band is idle, based on a received power of the channel in the unlicensed frequency band.

In one possible embodiment, the channel state determining module is specifically configured to: determine whether the channel in the unlicensed frequency band is idle, by comparing a total received power of the channel in the unlicensed frequency band with a first threshold. If the total received power is above the first threshold, the channel in the unlicensed frequency band is not idle, and if not, the channel in the unlicensed frequency band is idle.

In one possible embodiment, the channel state determining module is specifically configured to: determine whether the channel in the unlicensed frequency band is idle, by comparing a received power of a non-LTE signal in the channel in the unlicensed frequency band with a second threshold. If the received power of the non-LTE signal is above the second threshold, the channel in the unlicensed frequency band is not idle, and if not, the channel in the unlicensed frequency band is idle.

In one possible embodiment, the channel state determining module is specifically configured to: determine whether the channel in the unlicensed frequency band is idle, by comparing a received power of an LTE signal in the channel in the unlicensed frequency band with a third threshold. If the received power of the LTE signal is above the third threshold, the channel in the unlicensed frequency band is idle, and if not, the channel in the unlicensed frequency band is not idle.

In one possible embodiment, the channel state determining module is specifically configured to: determine whether the channel in the unlicensed frequency band is idle, by comparing a received power of a signal of an operator other than a present operator in the channel in the unlicensed frequency band with a fourth threshold. If the received power of the signal of the operator other than the present operator is above the fourth threshold, the channel in the unlicensed frequency band is not idle, and if not, the channel in the unlicensed frequency band is idle.

In one possible embodiment, the channel state determining module is specifically configured to: determine whether the channel in the unlicensed frequency band is idle, by comparing a received power of an LTE signal of an operator other than the present operator in the channel in the unlicensed frequency band with a fifth threshold. If the received power of the LTE signal of the operator other than the present operator is above the fifth threshold, the channel in the unlicensed frequency band is not idle, and if not, the channel in the unlicensed frequency band is idle.

In one possible embodiment, the apparatus further includes an indication information transmitting module. The indication information transmitting module is configured to transmit the discovery signal indication information which indicates whether there is a discovery signal transmitted in the channel in the unlicensed frequency band.

In one possible embodiment, the indication information transmitting module is specifically configured to: transmit the discovery signal indication information through downlink control information (DCI) in the channel in the licensed frequency band.

In one possible embodiment, the indication information transmitting module is specifically configured to: transmit the discovery signal indication information in a first available downlink subframe in the current cycle of the discovery signal transmission period.

In one possible embodiment, the discovery signal indication information is configured to indicate whether there is a discovery signal transmitted in the channel at one or more frequency points in the unlicensed frequency band; or the discovery signal indication information is configured to indicate whether at least one cell transmits a discovery signal in the channel in the unlicensed frequency band.

Based on the same inventive concept as the method, according to a fourth aspect, the embodiments of the present disclosure further provide an access network device, which includes: a processor, memory and transceiver.

The processor is configured to read programs from the memory to perform the following operations: determining whether a channel in an unlicensed frequency band is idle; transmitting through the transceiver the discovery signal in the channel in the unlicensed frequency band during a current cycle of a discovery signal transmission period if the channel in the unlicensed frequency band is determined to be idle; and not transmitting through the transceiver the discovery signal in the channel in the unlicensed frequency band during the current cycle if the channel in the unlicensed frequency band is determined to be not idle.

The transceiver is configured to be controlled by the processor to receive and transmit data.

In one possible embodiment, the processor is configured to read programs from the memory to perform the following operations: measuring the channel in the unlicensed frequency band in a preset time period before the current cycle of the discovery signal transmission period; and determining based on a measurement result whether the channel in the unlicensed frequency band is idle.

In one possible embodiment, the processor is configured to read programs from the memory to perform the following operations: determining whether the channel in the unlicensed frequency band is idle, based on a received power of the channel in the unlicensed frequency band.

In one possible embodiment, the processor is configured to read programs from the memory to perform the following operations: determining whether the channel in the unlicensed frequency band is idle, by comparing a total received power of the channel in the unlicensed frequency band with a first threshold. If the total received power is above the first threshold, the channel in the unlicensed frequency band is not idle, and if not, the channel in the unlicensed frequency band is idle.

In one possible embodiment, the processor is configured to read programs from the memory to perform the following operations: determining whether the channel in the unlicensed frequency band is idle, by comparing a received power of a non-LTE signal in the channel in the unlicensed frequency band with a second threshold. If the received power of the non-LTE signal is above the second threshold, the channel in the unlicensed frequency band is not idle, and if not, the channel in the unlicensed frequency band is idle.

In one possible embodiment, the processor is configured to read programs from the memory to perform the following operations: determining whether the channel in the unlicensed frequency band is idle, by comparing a received power of an LTE signal in the channel in the unlicensed frequency band with a third threshold. If the received power of the LTE signal is above the third threshold, the channel in the unlicensed frequency band is idle, and if not, the channel in the unlicensed frequency band is not idle.

In one possible embodiment, the processor is configured to read programs from the memory to perform the following operations: determining whether the channel in the unlicensed frequency band is idle, by comparing a received power of a signal of an operator other than a present operator in the channel in the unlicensed frequency band with a fourth threshold. If the received power of the signal of the operator other than the present operator is above the fourth threshold, the channel in the unlicensed frequency band is not idle, and if not, the channel in the unlicensed frequency band is idle.

In one possible embodiment, the processor is configured to read programs from the memory to perform the following operations: determining whether the channel in the unlicensed frequency band is idle, by comparing a received power of an LTE signal of an operator other than the present operator in the channel in the unlicensed frequency band with a fifth threshold. If the received power of the LTE signal of the operator other than the present operator is above the fifth threshold, the channel in the unlicensed frequency band is not idle, and if not, the channel in the unlicensed frequency band is idle.

In one possible embodiment, the processor is configured to read programs from the memory to perform the following operations: transmitting discovery signal indication information which indicates whether there is a discovery signal transmitted in the channel in the unlicensed frequency band.

In one possible embodiment, the processor is configured to read programs from the memory to perform the following operations: transmitting the discovery signal indication information through downlink control information (DCI) in the channel in the licensed frequency band.

In one possible embodiment, the processor is configured to read programs from the memory to perform the following operations: transmitting the discovery signal indication information in the first available downlink subframe in the current cycle of the discovery signal transmission period.

In one possible embodiment, the discovery signal indication information is configured to indicate whether there is a discovery signal transmitted in the channel at one or more frequency points in the unlicensed frequency band; or the discovery signal indication information is configured to indicate whether at least one cell transmits a discovery signal in the channel in the unlicensed frequency band.

Based on the same inventive concept as the method, according to a fifth aspect, the embodiments of the present disclosure further provide an apparatus of discovering a cell, which includes: a discovery signal receiving module and a cell discovering module.

The discovery signal receiving module is configured to receive a discovery signal in a channel in an unlicensed frequency band, and the discovery signal is transmitted when a base station determines that the channel in the unlicensed frequency band is idle.

The cell discovering module is configured to discover a cell of the base station, based on the discovery signal.

In one possible embodiment, the discovery signal receiving module is specifically configured to: receive discovery signal indication information which indicates whether there is a discovery signal transmitted in the channel in the unlicensed frequency band; and receive the discovery signal in the channel in the unlicensed frequency band if the discovery signal indication information indicates there is a discovery signal transmitted in the channel in the unlicensed frequency band.

In one possible embodiment, the discovery signal receiving module is specifically configured to, if the discovery signal indication information is received: receive the discovery signal indication information through downlink control information (DCI) in the channel in the licensed frequency band.

In one possible embodiment, the discovery signal receiving module is specifically configured to, if the discovery signal indication information is received: receive the discovery signal indication information in a first available downlink subframe in the current cycle of the discovery signal transmission period.

In one possible embodiment, the discovery signal receiving module is specifically configured to, if the discovery signal in the channel in the unlicensed frequency band is received: receive a discovery signal of a cell in the channel at the frequency point indicated by the discovery signal indication information in the unlicensed frequency band, and the discovery signal indication information indicates there is a discovery signal transmitted in the channel at one or more frequency points in the unlicensed frequency band; or receive the discovery signal transmitted in the channel in the unlicensed frequency band in the cell indicated by the discovery signal indication information which is used to indicate whether at least one cell transmits a discovery signal in the channel in the unlicensed frequency band.

In one possible embodiment, the discovery signal receiving module is specifically configured to: blind-detect the discovery signal in the channel in the unlicensed frequency band at a known transmission time of the discovery signal.

The technical solutions provided by the embodiments of the present disclosure may transmit the discovery signal in the unlicensed frequency band so as to avoid the strain on the licensed frequency band resources, which results in no spectrum resource to be allocated for the discovery signal or the strong interference caused by transmitting the discovery signal.

Based on the same inventive concept as the method, according to a sixth aspect, the embodiments of the present disclosure further provide a user equipment (UE), which includes: a processor, memory and transceiver.

The processor reads programs from the memory to perform the following operations: receiving through the transceiver a discovery signal in a channel in an unlicensed frequency band. The discovery signal is transmitted when a base station determines that the channel in the unlicensed frequency band is idle; and discovering a cell of the base station based on the discovery signal.

In one possible embodiment, the processor reads programs from the memory to perform the following operations: receiving discovery signal indication information which indicates whether there is a discovery signal transmitted in the channel in the unlicensed frequency band; and receiving the discovery signal in the channel in the unlicensed frequency band if the discovery signal indication information indicates there is a discovery signal transmitted in the channel in the unlicensed frequency band.

In one possible embodiment, the processor reads programs from the memory to perform the following operations: receiving the discovery signal indication information through downlink control information (DCI) in the channel in the licensed frequency band.

In one possible embodiment, the processor reads programs from the memory to perform the following operations: receiving the discovery signal indication information in a first available downlink subframe in the current cycle of the discovery signal transmission period.

In one possible embodiment, the processor reads programs from the memory to perform the following operations: receiving a discovery signal of a cell in the channel at the frequency point indicated by the discovery signal indication information in the unlicensed frequency band, and the discovery signal indication information indicates there is a discovery signal transmitted in the channel at one or more frequency points in the unlicensed frequency band; or receiving the discovery signal transmitted in the channel in the unlicensed frequency band in a cell indicated by the discovery signal indication information which is used to indicate whether at least one cell transmits a discovery signal in the channel in the unlicensed frequency band.

The processor reads programs from the memory to perform the following operation, if no discovery signal indication information is received: blind-detecting the discovery signal in the channel in the unlicensed frequency band at a known transmission time of the discovery signal.

(III) Beneficial Effects

The present disclosure has the following beneficial effects: the technical solutions provided by the embodiments of the present disclosure may transmit the discovery signal on the unlicensed frequency bands so as to avoid the strain on the licensed frequency band resources, which results in no spectrum resource to be allocated for the discovery signal or the strong interference caused by transmitting the discovery signal.

BRIEF DESCRIPTION OF THE DRAWINGS

In order to more clearly illustrate embodiments of the present disclosure or the technical solutions in the related art, drawings which are required to be used in the description of the embodiments will be briefly described below. Apparently, the drawings in the following description relate to only some embodiments of the present disclosure. It will be apparent to a person of ordinary skills in the art that other drawings may be derived from the drawings without any creative work.

DETAILED DESCRIPTION

Figure 1:
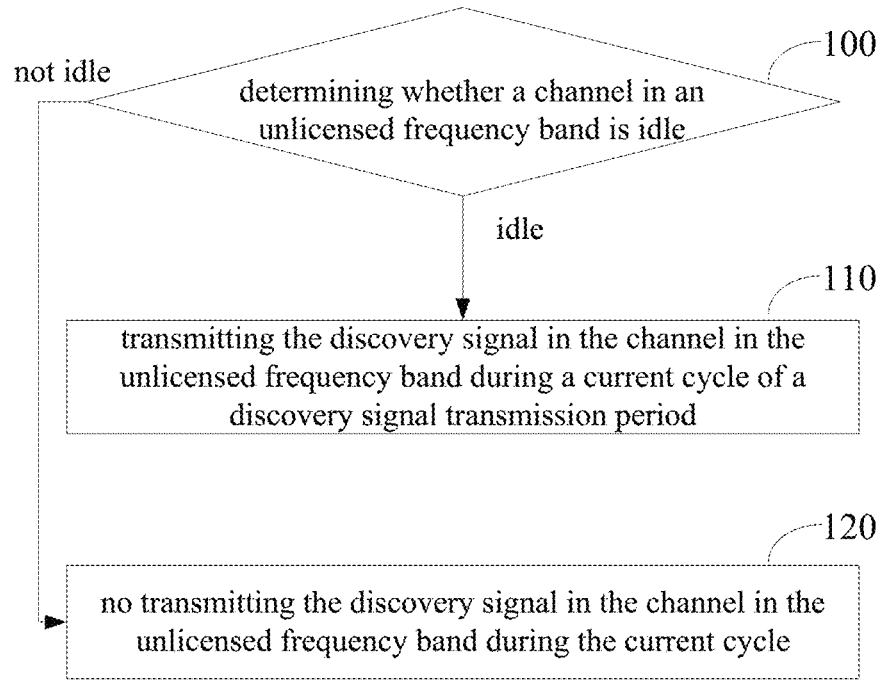
FIG. 1 is a flow chart of a method of transmitting a discovery signal provided by an embodiment of the present disclosure.

The present disclosure will be specifically described in conjunction with accompanying drawings and embodiments. The following embodiments are merely illustrative of the present disclosure and are not intended to limit the scope of the present disclosure.

In order to make the objectives, technical solutions and advantages of the embodiments of the present disclosure more clear, the technical solutions of the embodiments of the present disclosure will be clearly and completely described below with reference to the accompanying drawings of the embodiments of the present disclosure. Apparently, the described embodiments are part of the embodiments of the present disclosure, but not all the embodiments. All other embodiments obtained by a person of ordinary skills in the art based on the described embodiments of the present disclosure are intended to be within the scope of the present disclosure.

Unless otherwise defined, technical or scientific terms used herein shall have the ordinary meanings as understood by a person of ordinary skills in the art to which the present disclosure pertains. The words "first," "second," and the like as used in the specification and claims of the present disclosure do not denote any order, amount or importance, but are merely used to distinguish different constituent parts. Similarly, the words "a" or "an" and the like are merely used to represent the existence of at least one member, rather than to limit the number thereof. The words "connect" or "connected" and the like are not limited to physical or mechanical connections, but may include electrical connections, whether direct or indirect. The words "on," "under," "left" and "right" and the like are merely used to indicate relative position relationships, and when an absolute position of the described object changes, the relative position relationships changes accordingly.

The technical solutions of the embodiments of the present disclosure will be clearly and completely described below with reference to the accompanying drawings of the embodiments of the present disclosure. Apparently, the described embodiments are only part of the embodiments of the present disclosure, but not all the embodiments. All other embodiments obtained by a person of ordinary skills in the art based on the described embodiments of the present disclosure are intended to be within the scope of the present disclosure.

Spectrum resources in the related art may be categorized into licensed spectrum resources (also known as licensed frequency bands) and unlicensed spectrum resources (also known as unlicensed frequency bands). The licensed frequency bands are allocated and dedicated spectrum resources, the interference of which is basically predictable. On the other hand, no specific application system is planned for the unlicensed frequency bands, and numerous wireless communication systems may use the shared and unlicensed frequency bands by means of contending for resources. Currently, the wireless communication systems using the unlicensed frequency bands include bluetooth systems, wireless high fidelity (WiFi) systems, etc. The technical solutions provided by the embodiments of the present disclosure may transmit the discovery signal in the unlicensed frequency bands so as to avoid the strain on the licensed frequency band resources, which results in no spectrum resource to be allocated for the discovery signal or the strong interference caused by transmitting the discovery signal.

Hereinafter, the technical solutions provided by the embodiments of the present disclosure will be described in detail in conjunction with the accompanying drawings.

As shown in FIG. 1, the method of transmitting a discovery signal provided by the embodiments of the present disclosure specifically includes the following steps, i.e., step 100, step 110 and step 120.

In step 100, determining whether a channel in an unlicensed frequency band is idle.

In the embodiments of the present disclosure, the unlicensed frequency band refers to a frequency band that can be used without the authorization of the radio spectrum management authority, such as 2.4 GHz or 5 GHz.

In step 110, transmitting the discovery signal in the channel in the unlicensed frequency band during a current cycle of a discovery signal transmission period if the channel in the unlicensed frequency band is determined to be idle.

In the embodiments of the present disclosure, the discovery signal may be either a discovery signal as defined in Release 12 (R12) of the Third Generation Partnership Project (3GPP), such as a primary synchronization signal (PSS)/secondary synchronization signal (SSS)/cell specific reference signal (CRS) and network configurable channel state information reference signal (CSI-RS); or a newly designed discovery signal. The newly designed discovery signal may be a discovery signal which has at least some or all of the functions of UE group time-frequency synchronization, cell and/or transmission point detection/RRM measurement, etc., and is different from the discovery signal defined in R12.

In step 120, not transmitting the discovery signal in the channel in the unlicensed frequency band during the current cycle if the channel in the unlicensed frequency band is determined to be not idle.

According to the method of transmitting a discovery signal provided by the embodiments of the present disclosure, the problems caused by the strain on the licensed spectrum resources may be addressed. Since the channel in the unlicensed frequency band is determined to be idle or not at first and the discovery signal is transmitted in the channel in the unlicensed frequency band only in the event that the channel is idle, the interference to other communication systems operating in the channel in the unlicensed frequency band may be avoided.

The technical solutions provided by the embodiments of the present disclosure may be used by, but not limited to, the small cell/TP to transmit the discovery signal.

As for devices capable of detecting multiple channels simultaneously, such as micro base stations and small cells/TPs, it is possible to simultaneously determine whether a plurality of channels in the unlicensed frequency band is idle. If at least one channel is idle, the discovery signal is transmitted in some or all of the idle channels; if no channel is idle, the discovery signal is not transmitted in the unlicensed frequency band.

On the other hand, as for devices not capable of detecting multiple channels simultaneously or even for the devices capable of detecting multiple channels simultaneously, it is possible to determine whether one channel in the unlicensed frequency band is idle. If the channel is idle, the discovery signal is transmitted in this channel; otherwise, continue to determine whether another channel in the unlicensed frequency band is idle, until the idle channel is found or there is no channel in the unlicensed frequency band to be determined.

In the embodiments of the present disclosure, which channels in the unlicensed frequency band are to be determined may be done based on the requirements or pre-agreed, and the present disclosure is not limited thereto. If at least two channels in the unlicensed frequency band are to be determined, the determination sequence may be random, or the determination process may be conducted on the channels sequentially, and the present disclosure is not limited thereto.

Based on any of the above-mentioned embodiment, in step 100, it is possible to measure the channel in the unlicensed frequency band in a preset time period before the current cycle of the discovery signal transmission period; and based on the measurement result, it is determined whether the channel in the unlicensed frequency band is idle.

In the embodiments of the present disclosure, the cycle refers to the transmission cycle of the discovery signal. For example, the cycle may be the discovery signal transmission cycle defined in the Release 12 of the 3GPP, such as 40 ms, 80 ms, 160 ms and so on.

In the embodiments of the present disclosure, the end time of the above-mentioned preset time period may also be the start time of the current cycle of the discovery signal transmission period, or may be earlier than the start time of the current cycle of the discovery signal transmission period. In one possible embodiment, a length of the interval between the start time of the above-mentioned preset time period and the start time of the current cycle of the discovery signal transmission period is equal to the size of the distributed interframe space (DIFS) of the WiFi system in the related art.

In the embodiments of the present disclosure, the measurement may be continued for the above-mentioned predetermined time period, or may be discontinuously measured at least once in the above-mentioned predetermined time period.

Based on any of the above-mentioned embodiments, in step 100, it is determined whether the channel in the unlicensed frequency band is idle based on the received power of the channel in the unlicensed frequency band.

It should be noted no matter whether it is simultaneously determined whether at least two idle channels are idle or it is sequentially determined whether at least two channels are idle, the received power of the channel in the above-mentioned unlicensed frequency band refers to the received power of one single channel.

There may be numerous embodiments, and some optional embodiment will be exemplified below.

First Embodiment

By comparing the total received power of the channel in the unlicensed frequency band with a first threshold, it is determined whether the channel in the unlicensed frequency band is idle; if the total received power is above the first threshold, the channel in the unlicensed frequency band is not idle, otherwise, the channel in the unlicensed frequency band is idle.

If the channel in the unlicensed frequency band is measured during the preset time period before the current cycle of the discovery signal transmission period, the total received power of the channel in the above-mentioned unlicensed frequency band refers to a total received power of respective measurements of the channel in the above-mentioned unlicensed frequency band during the preset time period, or an average received power of the measurements, or a measured maximum received power, or a received power of any one of the measurements. In one possible embodiment, within the preset time period, if each of the measurement results indicates that the channel is idle, the channel is determined to be idle. If at least one measurement result indicates that the channel is not idle, the channel is determined not to be idle.

Second Embodiment

By comparing the received power of non-LTE signals in the channel in the unlicensed frequency band with a second threshold, it is determined whether the channel in the unlicensed frequency band is idle; if the received power of the non-LTE signals is above the second threshold, the channel in the unlicensed frequency band is not idle, otherwise, the channel in the unlicensed frequency band is idle.

LTE signals refer to any signals transmitted by the LTE system.

The non-LTE signals refer to signals transmitted by communication systems other than the LTE system in the channel in the unlicensed frequency band.

If the channel in the unlicensed frequency band is measured during the preset time period before the current cycle of the discovery signal transmission period, the received power of the non-LTE signals in the channel in the above-mentioned unlicensed frequency band refers to a total received power of the non-LTE signals in the channel in the above-mentioned unlicensed frequency band during the preset time period, or an average received power of the non-LTE signals, or a measured maximum received power of the non-LTE signals, or a received power of any one of the measurements of the non-LTE signals. In one possible embodiment, during the preset time period, if each of the measurement results indicates that the channel is idle, the channel is determined to be idle. If at least one measurement result indicates that the channel is not idle, the channel is determined not to be idle.

The measuring on the received power of the non-LTE signals in the unlicensed frequency band may be achieved in numerous ways. For example, based on the information about the LTE signals such as the LTE cell ID, the received power of the LTE signals in the channel in the unlicensed frequency band is measured, and then the received power of the non-LTE signals is obtained by subtracting the received power of the LTE signals from the total received power of the channels in the unlicensed frequency band. Further, for example, based on information about the LTE signals such as the LTE cell ID, the LTE signals are obtained, and then the non-LTE signals are obtained by subtracting the LTE signals from the received total signals in the channel in the unlicensed frequency band. And then the received powers of respective non-LTE signals are measured.

The information about the LTE signals such as the LTE cell ID may be obtained by searching and detecting, or may be obtained through transmission between base stations (e.g. using an X2 interface to receive the transmission), or may be obtained from the information such as the LTE cell ID of the adjacent cell/adjacent base station preset in the network planning information.

The base station performs channel estimation and/or data detection and decoding on the received signals based on the obtained cell ID and other information, and reconstructs the LTE signals based on the result of the channel estimation.

The process of reconstructing the LTE signals is, for example, to generate the original pilot sequence based on the LTE cell ID and/or to generate data symbols according to the procedure defined by the existing 36.212 protocol on the basis of the decoded data, and to multiply the original pilot sequence or data symbols with a channel factor H obtained from the channel estimation, thereby obtaining the reconstructed LTE signals.

The second embodiment is applicable to the scenario in which a single operator uses the unlicensed frequency band. If the received power of any one of the non-LTE signals is above the second threshold, it is considered that there exist signals of communication systems (such as WiFi communication systems) other than the LTE system, and the discovery signal is not transmitted to avoid interference; otherwise, there do not exist signals of communication systems other than the LTE system, and the discovery signal is transmitted.

Third Embodiment

By comparing the received power of the LTE signals in the channel in the unlicensed frequency band with a third threshold, it is determined whether the channel in the unlicensed frequency band is idle; if the received power of the LTE signals is above the third threshold, the channel in the unlicensed frequency band is idle, otherwise, the channel in the unlicensed frequency band is not idle.

If the channel in the unlicensed frequency band is measured during the preset time period before the current cycle of the discovery signal transmission period, the received power of the LTE signals in the channel in the above-mentioned unlicensed frequency band refers to a total received power of the LTE signals in the channel in the above-mentioned unlicensed frequency band during the preset time period, or an average received power of the LTE signals, or a measured maximum received power of the LTE signals, or a received power of any one of the measurements of the LTE signals. In one possible embodiment, during the preset time period, if each of the measurement results indicates that the channel is idle, the channel is determined to be idle. If at least one measurement result indicates that the channel is not idle, the channel is determined not to be idle.

The measuring on the received power of the LTE signals in the unlicensed frequency band may be achieved in numerous ways. For example, the received power of the LTE signals in the channel in the unlicensed frequency band is measured based on information about the LTE signals such as the LTE cell ID.

The information about the LTE signals such as the LTE cell ID may be obtained by searching and detecting, or may be obtained through transmission between base stations (e.g. using the X2 interface to receive the transmission), or may be obtained from the information such as the LTE cell ID of the adjacent cell/adjacent base station preset in the network planning information.

The third embodiment is applicable to the scenario in which one single operator uses the unlicensed frequency band. If the received power of the LTE signals is above the third threshold, it is considered that the channel in the above-mentioned unlicensed frequency band is occupied by the LTE system, and the discovery signal is transmitted; otherwise, it is considered that the channel in the above-mentioned unlicensed frequency band is occupied by communication systems other than the LTE system, and the discovery signal is not transmitted.

Fourth Embodiment

By comparing the received power of the signals of operators other than the present operator in the channel in the unlicensed frequency band with a fourth threshold, it is determined whether the channel in the unlicensed frequency band is idle; if the received power of the signals of the operators other than the present operator is above the fourth threshold, the channel in the unlicensed frequency band is not idle, otherwise, the channel in the unlicensed frequency band is idle.

The signals of the operators other than the present operator refer to signals other than the LTE signals of the present operator.

If the channel in the unlicensed frequency band is measured during the preset time period before the current cycle of the discovery signal transmission period, the received power of the above-mentioned signals of the operators other than the present operator refers to a total received power of the signals of the operators other than the present operator in the channel in the above-mentioned unlicensed frequency band during the preset time period, or an average received power of the signals of the operators other than the present operator, or a measured maximum received power of the signals of the operators other than the present operator, or a received power of any one of the measurements of the signals of the operators other than the present operator. In one possible embodiment, during the preset time period, if each of the measurement results indicates that the channel is idle, the channel is determined to be idle. If at least one measurement result indicates that the channel is not idle, the channel is determined not to be idle.

The measuring on the received power of the signals of other operators in the unlicensed frequency band may be achieved in numerous ways. For example, based on the information about the LTE signals of the present operator such as the LTE cell ID of the present operator, the received power of the signals of the present operator in the channel in the unlicensed frequency band is measured, and then the received power of the signals of the operators other than the present operator is obtained by subtracting the received power of the LTE signals of the present operator from the total received power of the channel in the unlicensed frequency band. Further, for example, based on the information about the LTE signals of the present operator such as the LTE cell ID of the present operator, the signals of the present operator are measured, and then the signals of the operators other than the present operator are obtained by subtracting the signals of the present operator from the totally received signals in the channel in the unlicensed frequency band, and then the received power of the signals of the operators other than the present operator is measured.

The information about the LTE signals of the present operator such as the LTE cell ID of the present operator may be obtained by searching and detecting, or may be obtained through transmission between base stations (e.g. using the X2 interface to receive the transmission), or may be obtained from the information such as the LTE cell ID of the adjacent cell/adjacent base station preset in the network planning information.

The base station performs channel estimation and/or data detection and decoding on the received signal based on the obtained LTE cell ID of the present operator and other information, and reconstructs the LTE signals of the present operator based on the result of the channel estimation.

The process of reconstructing the LTE signal of the present operator may refer to the above-mentioned second embodiment, and will not be repeated herein.

The fourth embodiment is applicable to the scenario in which numerous operators including at least one LTE system operator share the spectrum in the unlicensed frequency band. If the received power of the signals of the operators other than the present operator is above the fourth threshold, it is considered that the channel in the above-mentioned unlicensed frequency band is occupied by communication systems of operators other than the present operator, and the discovery signal is not transmitted to avoid interference; otherwise, it is considered that the channel in the above-mentioned unlicensed frequency band is occupied by the present operator, and the discovery signal is transmitted.

Fifth Embodiment

By comparing the received power of the LTE signals of the operators other than the present operator in the channel in the unlicensed frequency band with a fifth threshold, it is determined whether the channel in the unlicensed frequency band is idle; if the received power of the LTE signals of the operators other than the present operator is above the fifth threshold, the channel in the unlicensed frequency band is not idle; otherwise, the channel in the unlicensed frequency band is idle.

The LTE signals of the operators other than the present operator refer to signals transmitted by LTE systems of operators other than the present operator.

If the channel in the unlicensed frequency band is measured during the preset time period before the current cycle of the discovery signal transmission period, the received power of the LTE signals of the operators other than the present operator in the channel in the above-mentioned unlicensed frequency band refers to a total received power of the LTE signals of the operators other than the present operator in the channel in the above-mentioned unlicensed frequency band during the preset time period, or an average received power of the LTE signals of the operators other than the present operator, or a measured maximum received power of the LTE signals of the operators other than the present operator, or a received power of any one of the measurements of the LTE signals of the operators other than the present operator. In one possible embodiment, during the preset time period, if each of the measurement results indicates that the channel is idle, the channel is determined to be idle. If at least one measurement result indicates that the channel is not idle, the channel is determined not to be idle.

The measuring on the received power of the LTE signals of other operators in the unlicensed frequency band may be achieved in numerous ways. For example, based on the information about the LTE signals such as the LTE cell ID of the operators other than the present operator, the received power of the LTE signals of the operators other than the present operator in the channel in the unlicensed frequency band is measured.

The information about the LTE signals such as the LTE cell ID of the operators other than the present operator may be obtained by searching and detecting, or may be obtained through transmission between base stations (e.g. using the X2 interface to receive the transmission), or may be obtained from the information such as the LTE cell ID of the adjacent cell/adjacent base station preset in the network planning information.

The fifth embodiment is applicable to the scenario in which the LTE systems of numerous operators share the spectrum in the unlicensed frequency band. If the received power of the LTE signals of the operators other than the present operator is above the fifth threshold, it is considered that the channel in the above-mentioned unlicensed frequency band is occupied by the LTE systems of the operators other than the present operator, and the discovery signal is not transmitted to avoid interference. Otherwise, it is considered that the channel in the above-mentioned unlicensed frequency band is occupied by the LTE system of the present operator, and the discovery signal is transmitted.

In one possible embodiment, based on any of the above-mentioned embodiments, discovery signal indication information is also transmitted, which is used to indicate whether there is a discovery signal transmitted in the channel in the unlicensed frequency band.

In particular, the discovery signal indication information may indicate whether there are discovery signals transmitted in the channels at one or more frequency points of the unlicensed frequency band.

The discovery signal indication information may also indicate whether one or more cells transmit the discovery signals in the unlicensed frequency band. In one possible embodiment, the one or more cells belong to a same base station.

By transmitting the discovery signal indication information to the UE, the workload of the blind detection on the discovery signal by the UE may be avoided or reduced.

In particular, a mapping relationship between the frequency points or cells and indication bits may be established in the discovery signal indication information. For example, each frequency point or cell corresponds to one bit. Specifically, as for the bit, "1" indicates that the discovery signal is transmitted, and "0" indicates that the discovery signal is not transmitted.

In particular, the discovery signal indication information may be transmitted in a downlink indication channel (e.g., downlink control information (DCI), or a newly set indication channel) in the licensed frequency band. It is possible to establish a correspondence between the downlink indication channel and the transmission of the discovery signal. For example the indication channel in a certain subframe or a certain subframe section indicates the transmission of the discovery signal in a periodic transmission chance of the discovery signal immediately following the indication channel. Alternatively, the downlink indication channel subframe is transmitted in a same subframe as the discovery signal or in another subframe following the discovery signal subframe. The carriers/cells transmitted in the downlink indication channel is required to have the same downlink transmission timing as the discovery signal transmission carrier/cell.

It should be noted it may also be possible to transmit the discovery signal indication information in the unlicensed frequency band, and thus the present disclosure is not limited to transmitting the discovery signal indication information in a specific frequency band.

Figure 2:
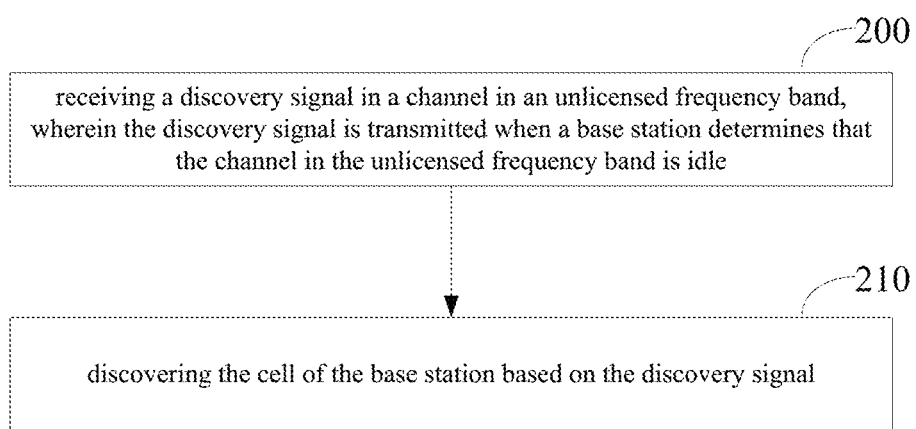
FIG. 2 is a flow chart of a method of discovering a cell provided by an embodiment of the present disclosure.

As shown in FIG. 2, the embodiments of the present disclosure also provide a method of discovering a cell, which specifically includes the following operations, i.e., step 200 and step 210.

In step 200, receiving a discovery signal in a channel in an unlicensed frequency band. The discovery signal is transmitted when a base station determines that the channel in the unlicensed frequency band is idle.

In step 210, discovering the cell of the base station based on the discovery signal.

According to the method provided by the embodiments of the present disclosure, the problems caused by the strain on the licensed spectrum resources may be addressed. Since the channel in the unlicensed frequency band is determined to be idle or not at first and the discovery signal is transmitted in the channel in the unlicensed frequency band only in the event that the channel is idle, the interference to other communication systems operating on the channel in the unlicensed frequency band may be avoided.

The method of discovering the cell may be divided into a process of transmitting the discovery signal and a process of discovering the cell based on the discovery signal. In one possible embodiment, for the process of transmitting the discovery signal, discovery signal indication information may be received, which is used to indicate whether there is a discovery signal transmitted in the channel in the unlicensed frequency band. If the discovery signal indication information indicates there is a discovery signal transmitted in the channel in the unlicensed frequency band, the discovery signal is received in the channel in the unlicensed frequency band.

If the discovery signal indication information indicates there is discovery signals transmitted in the channels at one or more frequency points, the discovery signals of different cells are received in the channels at the indicated frequency points. If the discovery signal indication information indicates there are discovery signals transmitted in one or more cells, the discovery signals in the channel in the unlicensed frequency band are received in the indicated cells.

In one possible embodiment, in particular, the discovery signal indication information may be received through the DCI in the channel in the licensed frequency band.

In one possible embodiment, the discovery signal indication information is received in the first available downlink subframe in the current cycle of the discovery signal transmission period.

If no discovery signal indication information is received, the receiving of the discovery signal in the channel in the unlicensed frequency band may be achieved by blind-detecting the discovery signal in the channel in the unlicensed frequency band during the known transmission time of the discovery signal.

Figure 3:
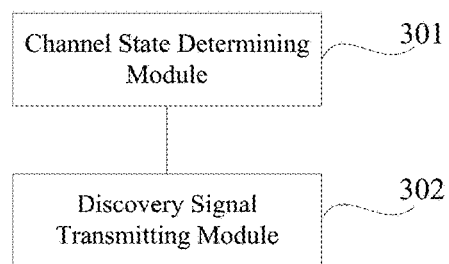
FIG. 3 is a schematic diagram of an apparatus of transmitting a discovery signal provided by an embodiment of the present disclosure.

Based on the same inventive concept as the method, the embodiments of the present disclosure further provide an apparatus of transmitting a discovery signal, which, as shown in FIG. 3, includes: a channel state determining module 301, configured to determine whether a channel in an unlicensed frequency band is idle; and a discovery signal transmitting module 302, configured to transmit the discovery signal in the channel in the unlicensed frequency band during a current cycle of a discovery signal transmission period if the channel in the unlicensed frequency band is determined to be idle; and configured not to transmit the discovery signal in the channel in the unlicensed frequency band during the current cycle if the channel in the unlicensed frequency band is determined to be not idle.

In one possible embodiment, the channel state determining module 301 is specifically configured to: measure the channel in the unlicensed frequency band in a preset time period before the current cycle of the discovery signal transmission period; and determine whether the channel in the unlicensed frequency band is idle, based on the measurement result.

In one possible embodiment, the channel state determining module 301 is specifically configured to: determine whether the channel in the unlicensed frequency band is idle, based on the received power of the channel in the unlicensed frequency band.

In one possible embodiment, the channel state determining module 301 is specifically configured to: determine whether the channel in the unlicensed frequency band is idle, by comparing the total received power of the channel in the unlicensed frequency band with a first threshold, and if the total received power is above the first threshold, the channel in the unlicensed frequency band is not idle, otherwise, the channel in the unlicensed frequency band is idle; or determine whether the channel in the unlicensed frequency band is idle, by comparing the received power of non-LTE signals in the channel in the unlicensed frequency band with a second threshold, and if the received power of the non-LTE signals is above the second threshold, the channel in the unlicensed frequency band is not idle, otherwise, the channel in the unlicensed frequency band is idle; or determine whether the channel in the unlicensed frequency band is idle, by comparing the received power of LTE signals in the channel in the unlicensed frequency band with a third threshold, and if the received power of the LTE signals is above the third threshold, the channel in the unlicensed frequency band is idle, otherwise, the channel in the unlicensed frequency band is not idle; or determine whether the channel in the unlicensed frequency band is idle, by comparing the received power of the signals of operators other than the present operator in the channel in the unlicensed frequency band with a fourth threshold, and if the received power of the signals of the operators other than the present operator is above the fourth threshold, the channel in the unlicensed frequency band is not idle, otherwise, the channel in the unlicensed frequency band is idle; or determine whether the channel in the unlicensed frequency band is idle, by comparing the received power of LTE signals of operators other than the present operator in the channel in the unlicensed frequency band with a fifth threshold, and if the received power of the LTE signals of the operators other than the present operator is above the fifth threshold, the channel in the unlicensed frequency band is not idle, otherwise, the channel in the unlicensed frequency band is idle.

In one possible embodiment, the channel state determining module 301 is further configured to, before determining whether the channel in the unlicensed frequency band is idle: measure the received power of the LTE signals in the channel in the unlicensed frequency band based on the obtained information about the LTE signals.

In one possible embodiment, the channel state determining module is further configured to: determine the received power of the non-LTE signals in the channel in the unlicensed frequency band, based on measured total received power of the channel in the unlicensed frequency band and the received power of the LTE signals.

In one possible embodiment, an indication information transmitting module may be included. The indication information transmitting module is configured to: transmit discovery signal indication information which indicates whether there is a discovery signal transmitted in the channel in the unlicensed frequency band.

In one possible embodiment, the indication information transmitting module is specifically configured to: transmit the discovery signal indication information through downlink control information (DCI) in the channel in the licensed frequency band.

In one possible embodiment, the indication information transmitting module is specifically configured to: transmit the discovery signal indication information in the first available downlink subframe in the current cycle of the discovery signal transmission period.

In one possible embodiment, the discovery signal indication information is configured to indicate whether there is a discovery signal transmitted in the channel at one or more frequency points in the unlicensed frequency band; or the discovery signal indication information is configured to indicate whether at least one cell transmits the discovery signal in the channel in the unlicensed frequency band.

Figure 4:
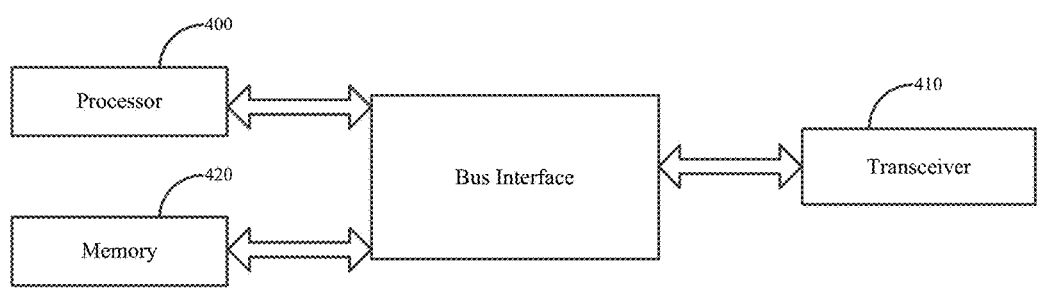
FIG. 4 is a schematic diagram of an access network device provided by an embodiment of the present disclosure.

Based on the same inventive concept as the method, the embodiments of the present disclosure further provide an access network device, which, as shown in FIG. 4, includes: a processor 400, a transceiver 410 and a memory 420.

The processor 400 is configured to read programs from the memory 420 to perform the following operations: determining whether a channel in an unlicensed frequency band is idle; transmitting through the transceiver 410 the discovery signal in the channel in the unlicensed frequency band during a current cycle of a discovery signal transmission period if the channel in the unlicensed frequency band is determined to be idle; and not transmitting the discovery signal in the channel in the unlicensed frequency band during the current cycle if the channel in the unlicensed frequency band not is determined to be idle.

The transceiver 410 is configured to receive and transmit data under the control of the processor 400.

As shown in FIG. 4, the bus architecture may include any number of interconnected busses and bridges, in particular the various circuits of one or more processors represented by the processor 400 and the memories represented by the memory 420 are linked together. The bus architecture may also link various other circuits, such as peripheral devices, voltage regulators and power management circuits, which are well known in the art, and therefore will not be further described herein. The bus interface provides interfaces. The transceiver 410 may be a plurality of elements, i.e. including a transmitter and a transceiver, so as to provide units for communicating with various other devices over a transmission medium. The processor 400 is responsible for managing the bus architecture and general processing, and the memory 420 may store data used by the processor 400 to perform operations.

In the embodiments of the present disclosure, the access network device may be, but not limited to, a small cell/TP.

Figure 5:
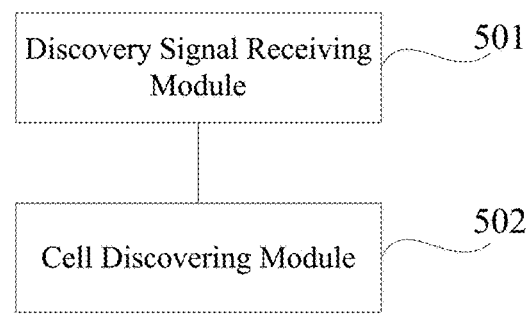
FIG. 5 is a schematic diagram of an apparatus of discovering a cell provided by an embodiment of the present disclosure.

Based on the same inventive concept as the method, the present disclosure further provides an apparatus of discovering a cell, which, as shown in FIG. 5, includes: a discovery signal receiving module 501 and a cell discovering module 502.

The discovery signal receiving module 501 is configured to receive a discovery signal in a channel in an unlicensed frequency band. The discovery signal is transmitted when a base station determines that the channel in the unlicensed frequency band is idle.

The cell discovering module 502 is configured to discover a cell of the base station based on the discovery signal.

In one possible embodiment, the discovery signal receiving module 501 is specifically configured to: receive discovery signal indication information which indicates whether there is a discovery signal transmitted in the channel in the unlicensed frequency band, and receive the discovery signal in the channel in the unlicensed frequency band if the discovery signal indication information indicates there is a discovery signal transmitted in the channel in the unlicensed frequency band.

In one possible embodiment, the discovery signal receiving module 501 is specifically configured to, if the discovery signal indication information is received: receive the discovery signal indication information through downlink control information (DCI) in the channel in the licensed frequency band.

In one possible embodiment, the discovery signal receiving module 501 is specifically configured to, if the discovery signal indication information is received: receive the discovery signal indication information in the first available downlink subframe in the current cycle of the discovery signal transmission period.

In one possible embodiment, the discovery signal receiving module 501 is specifically configured to, if the discovery signal in the channel in the unlicensed frequency band is received: receive the discovery signals of the cells in the channel at the frequency point indicated by the discovery signal indication information in the unlicensed frequency band, and the discovery signal indication information indicates there is a discovery signal transmitted in the channel at one or more frequency points in the unlicensed frequency band; or receive the discovery signal transmitted in the channel in the unlicensed frequency band in the cell indicated by the discovery signal indication information which is used to indicate whether at least one cell transmits a discovery signal in the channel in the unlicensed frequency band.

The discovery signal receiving module 501 is specifically configured to, if no discovery signal indication information is received: blind-detect the discovery signal in the channel in the unlicensed frequency band at the known transmission time of the discovery signal.

Figure 6:
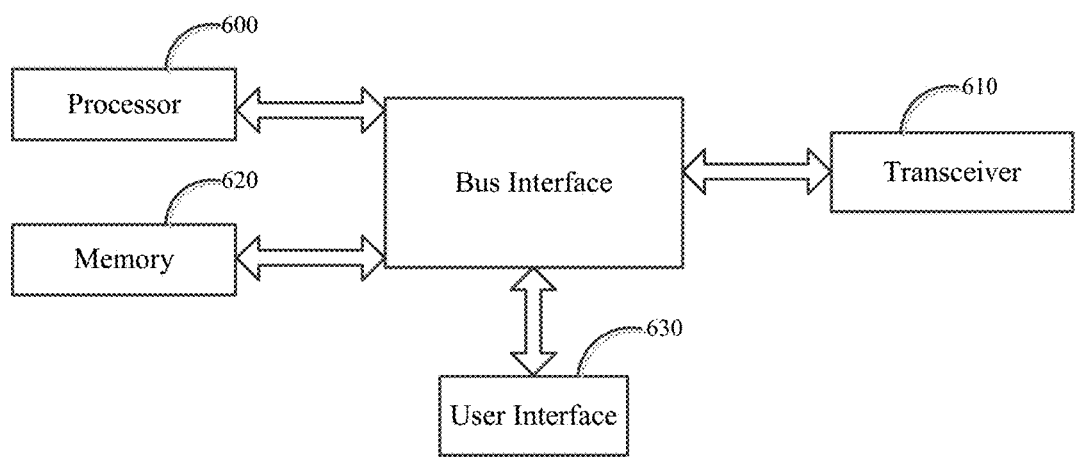
FIG. 6 is a schematic diagram of a UE provided by an embodiment of the present disclosure.

Based on the same inventive concept as the method, the embodiments of the present disclosure further provide a user equipment (UE), which, as shown in FIG. 6, includes: a processor 600, a transceiver 610, and a memory 620.

The processor 600 is configured to read programs from the memory 620 to perform the following operations: receiving through the transceiver 610 a discovery signal in a channel in an unlicensed frequency band, and the discovery signal is transmitted when a base station determines that the channel in the unlicensed frequency band is idle; and discovering a cell of the base station based on the discovery signal.

The transceiver 610 is configured to receive and transmit data under the control of the processor 600.

As shown in FIG. 6, the bus architecture may include any number of interconnected busses and bridges, in particular the various circuits of one or more processors represented by the processor 600 and the memories represented by the memory 620 are linked together. The bus architecture may also link various other circuits, such as peripheral devices, voltage regulators and power management circuits, which are well known in the art, and therefore will not be further described herein. The bus interface provides interfaces. The receiver 610 may be a plurality of elements, i.e. including a transmitter and a receiver, so as to provide units for communicating with various other devices over a transmission medium. For different user devices, the user interface 630 may also be an interface capable of externally connecting a desired device, including, but not limited to, a keypad, a display, a speaker, a microphone, a joystick, and the like.

The processor 600 is responsible for managing the bus architecture and general processing, and the memory 620 may store data used by the processor 600 to perform operations.

It should be appreciated by one of ordinary skill in the art that the present disclosure may be provided as a method, a system or a computer program product. Therefore, the present disclosure may be in the form of full hardware embodiments, full software embodiments, or combinations thereof. In addition, the present disclosure may be in the form of a computer program product implemented on one or more computer-readable storage mediums (including but not limited to disk memory, CD-ROM and optical memory) including computer-readable program codes.

The present disclosure has been described with reference to the flow charts and/or block diagrams of the method, device (system) and computer program product according to the embodiments of the present disclosure. It should be understood that computer program instructions may be used to implement each of the work flows and/or blocks in the flow charts and/or the block diagrams, and the combination of the work flows and/or blocks in the flow charts and/or the block diagrams. These computer program instructions may be provided to a processor of a general purpose computer, a special purpose computer, an embedded processor or other programmable data processing devices to create a machine, so that instructions executable by the processor of the computer or the other programmable data processing devices may create a device to achieve the functions assigned in one or more work flows in the flow chart and/or one or more blocks in the block diagram.

These computer program instructions may also be stored in a computer readable storage that may guide the computer or the other programmable data process devices to function in a certain way, so that the instructions stored in the computer readable storage may create a product including an instruction unit which achieves the functions assigned in one or more flows in the flow chart and/or one or more blocks in the block diagram.

These computer program instructions may also be loaded in the computer or the other programmable data process devices, so that a series of operation steps are executed on the computer or the other programmable devices to create processes achieved by the computer. Therefore, the instructions executed in the computer or the other programmable devices provide the steps for achieving the function assigned in one or more flows in the flow chart and/or one or more blocks in the block diagram.

Although optional embodiments of the present disclosure have been described, those skilled in the art may make other changes and modifications to the embodiments once they become aware of the basic inventive concept. Therefore, it is intended that the appended claims be interpreted as including optional embodiments and all changes and modifications that fall within the scope of the present disclosure.

It will be apparent to those skilled in the art that various modifications and variations may be made to the present disclosure without departing from the spirit and scope of the present disclosure. Thus, it is intended that the present disclosure encompasses such modifications and variations, if such modifications and variations are within the scope of the present patent claims and equivalents thereof.

What is claimed is:

1. A method of transmitting a discovery signal, comprising:

determining whether a channel in an unlicensed frequency band is idle;

transmitting the discovery signal in the channel in the unlicensed frequency band during a current cycle of a discovery signal transmission period if the channel in the unlicensed frequency band is determined to be idle; and not transmitting the discovery signal in the channel in the unlicensed frequency band during the current cycle if the channel in the unlicensed frequency band is determined to be not idle;

wherein the determining whether the channel in the unlicensed frequency band is idle comprises:

determining whether the channel in the unlicensed frequency band is idle, based on a received power of the channel in the unlicensed frequency band;

wherein the determining whether the channel in the unlicensed frequency band is idle based on the received power of the channel in the unlicensed frequency band comprises:

determining whether the channel in the unlicensed frequency band is idle, by comparing a total received power of the channel in the unlicensed frequency band with a first threshold, wherein if the total received power is above the first threshold, the channel in the unlicensed frequency band is not idle, and if not, the channel in the unlicensed frequency band is idle; or determining whether the channel in the unlicensed frequency band is idle, by comparing a received power of a non-LTE signal in the channel in the unlicensed frequency band with a second threshold, wherein if the received power of the non-LTE signal is above the second threshold, the channel in the unlicensed frequency band is not idle, and if not, the channel in the unlicensed frequency band is idle; or determining whether the channel in the unlicensed frequency band is idle, by comparing a received power of an LTE signal in the channel in the unlicensed frequency band with a third threshold, wherein if the received power of the LTE signal is above the third threshold, the channel in the unlicensed frequency band is idle, and if not, the channel in the unlicensed frequency band is not idle; or determining whether the channel in the unlicensed frequency band is idle, by comparing a received power of a signal of an operator other than a present operator in the channel in the unlicensed frequency band with a fourth threshold, wherein if the received power of the signal of the operator other than the present operator is above the fourth threshold, the channel in the unlicensed frequency band is not idle, and if not, the channel in the unlicensed frequency band is idle; or determining whether the channel in the unlicensed frequency band is idle, by comparing a received power of an LTE signal of an operator other than the present operator in the channel in the unlicensed frequency band with a fifth threshold, wherein if the received power of the LTE signal of the operator other than the present operator is above the fifth threshold, the channel in the unlicensed frequency band is not idle, and if not, the channel in the unlicensed frequency band is idle.

2. The method according to claim 1, wherein the determining whether a channel in an unlicensed frequency band is idle comprises:
measuring the channel in the unlicensed frequency band in a preset time period before the current cycle of the discovery signal transmission period; and
determining whether the channel in the unlicensed frequency band is idle, based on a measurement result.

3. The method according to claim 1, further comprising: transmitting discovery signal indication information which indicates whether there is a discovery signal transmitted in the channel in the unlicensed frequency band.

4. The method according to claim 3, wherein the transmitting discovery signal indication information comprises:
transmitting the discovery signal indication information through downlink control information (DCI) in the channel in the licensed frequency band.

5. The method according to claim 3, wherein the transmitting discovery signal indication information comprises:
transmitting the discovery signal indication information in a first available downlink subframe in the current cycle of the discovery signal transmission period.

6. The method according to claim 3, wherein the discovery signal indication information is configured to indicate whether there is a discovery signal transmitted in a channel at one or more frequency points in the unlicensed frequency band; or
the discovery signal indication information is configured to indicate whether at least one cell transmits a discovery signal in the channel in the unlicensed frequency band.

7. The method according to claim 1, wherein the unlicensed frequency band refers to unlicensed spectrum resource; and
the unlicensed frequency band is contended by a plurality of wireless communication systems for resources.

8. A method of discovering a cell, comprising:
receiving a discovery signal in a channel in an unlicensed frequency band, wherein the discovery signal is transmitted when a base station determines that the channel in the unlicensed frequency band is idle; and
discovering a cell of the base station based on the discovery signal;
wherein the receiving the discovery signal in the channel in the unlicensed frequency band comprises:
receiving discovery signal indication information which indicates whether the discovery signal is transmitted in the channel in the unlicensed frequency band; and
receiving the discovery signal in the channel in the unlicensed frequency band if the discovery signal indication information indicates the discovery signal is transmitted in the channel in the unlicensed frequency band;

determining whether the channel in the unlicensed frequency band is idle, based on a received power of the channel in the unlicensed frequency band;
wherein the determining whether the channel in the unlicensed frequency band is idle based on the received power of the channel in the unlicensed frequency band comprises:
determining whether the channel in the unlicensed frequency band is idle, by comparing a total received power of the channel in the unlicensed frequency band with a first threshold, wherein if the total received power is above the first threshold, the channel in the unlicensed frequency band is not idle, and if not, the channel in the unlicensed frequency band is idle; or
determining whether the channel in the unlicensed frequency band is idle, by comparing a received power of a non-LTE signal in the channel in the unlicensed frequency band with a second threshold, wherein if the received power of the non-LTE signal is above the second threshold, the channel in the unlicensed frequency band is not idle, and if not, the channel in the unlicensed frequency band is idle; or determining whether the channel in the unlicensed frequency band is idle, by comparing a received power of an LTE signal in the channel in the unlicensed frequency band with a third threshold, wherein if the received power of the LTE signal is above the third threshold, the channel in the unlicensed frequency band is idle, and if not, the channel in the unlicensed frequency band is not idle; or
determining whether the channel in the unlicensed frequency band is idle, by comparing a received power of a signal of an operator other than a present operator in the channel in the unlicensed frequency band with a fourth threshold, wherein if the received power of the signal of the operator other than the present operator is above the fourth threshold, the channel in the unlicensed frequency band is not idle, and if not, the channel in the unlicensed frequency band is idle; or
determining whether the channel in the unlicensed frequency band is idle, by comparing a received power of an LTE signal of an operator other than the present operator in the channel in the unlicensed frequency band with a fifth threshold, wherein if the received power of the LTE signal of the operator other than the present operator is above the fifth threshold, the channel in the unlicensed frequency band is not idle, and if not, the channel in the unlicensed frequency band is idle.

9. The method according to claim 8, wherein the receiving discovery signal indication information comprises: receiving the discovery signal indication information through downlink control information (DCI) in the channel in the licensed frequency band.

10. The method according to claim 8, wherein the receiving discovery signal indication information comprises:
receiving the discovery signal indication information in a first available downlink subframe in a current cycle of a discovery signal transmission period.

11. The method according to claim 8, wherein the receiving a discovery signal in a channel in an unlicensed frequency band comprises:
receiving a discovery signal of each cell in the channel at a frequency point indicated by the discovery signal indication information in the unlicensed frequency band, wherein the discovery signal indication information indicates there is a discovery signal transmitted in a channel at one or more frequency points in the unlicensed frequency band; or receiving the discovery signal transmitted in the channel in the unlicensed frequency band in a cell indicated by the discovery signal indication information which is used to indicate whether at least one cell transmits the discovery signal in the channel in the unlicensed frequency band.

12. The method according to claim 8, wherein the receiving a discovery signal in a channel in an unlicensed frequency band comprises:
blind-detecting the discovery signal in the channel in the unlicensed frequency band at a known transmission time of the discovery signal.

13. The method according to claim 8, wherein the unlicensed frequency band refers to unlicensed spectrum resource; and the unlicensed frequency band is contended by a plurality of wireless communication systems for resources.

14. A network side device, comprising:
a processor;
a memory, connected with the processor via a bus interface and configured to store programs and data used by the processor when performing operations; and
a transceiver, configured to be controlled by the processor to receive and transmit data,
when the processor calls and executes the program and data stored in the memory, the network side device realizes following steps:
determining whether a channel in an unlicensed frequency band is idle; and
transmitting through the transceiver a discovery signal in the channel in the unlicensed frequency band during a current cycle of a discovery signal transmission period if the channel in the unlicensed frequency band is determined to be idle; and
not transmitting the discovery signal in the channel in the the unlicensed frequency band during the current cycle if the channel in the the unlicensed frequency band is determined to be not idle;
wherein the determining whether the channel in the unlicensed frequency band is idle comprises:
determining whether the channel in the unlicensed frequency band is idle, based on a received power of the channel in the unlicensed frequency band;
wherein the determining whether the channel in the unlicensed frequency band is idle based on the received power of the channel in the unlicensed frequency band comprises:
determining whether the channel in the unlicensed frequency band is idle, by comparing a total received power of the channel in the unlicensed frequency band with a first threshold, wherein if the total received power is above the first threshold, the channel in the unlicensed frequency band is not idle, and if not, the channel in the unlicensed frequency band is idle; or
determining whether the channel in the unlicensed frequency band is idle, by comparing a received power of a non-LTE signal in the channel in the unlicensed frequency band with a second threshold, wherein if the received power of the non-LTE signal is above the second threshold, the channel in the unlicensed frequency band is not idle, and if not, the channel in the unlicensed frequency band is idle; or determining whether the channel in the unlicensed frequency band is idle, by comparing a received power of an LTE signal in the channel in the unlicensed frequency band with a third threshold, wherein if the received power of the LTE signal is above the third threshold, the channel in the unlicensed frequency band is idle, and if not, the channel in the unlicensed frequency band is not idle; or
determining whether the channel in the unlicensed frequency band is idle, by comparing a received power of a signal of an operator other than a present operator in the channel in the unlicensed frequency band with a fourth threshold, wherein if the received power of the signal of the operator other than the present operator is above the fourth threshold, the channel in the unlicensed frequency band is not idle, and if not, the channel in the unlicensed frequency band is idle; or
determining whether the channel in the unlicensed frequency band is idle, by comparing a received power of an LTE signal of an operator other than the present operator in the channel in the unlicensed frequency band with a fifth threshold, wherein if the received power of the LTE signal of the operator other than the present operator is above the fifth threshold, the channel in the unlicensed frequency band is not idle, and if not, the channel in the unlicensed frequency band is idle.

15. The network side device according to claim 14, wherein the determining whether a channel in an unlicensed frequency band is in an idle state comprises:
measuring the channel in the unlicensed frequency band in a preset time period before the discovery signal transmission period of the current cycle; and
determining whether the channel in the unlicensed frequency band is in the idle state, based on a measurement result.

16. A user side device, comprising:
a processor;
a memory, connected with the processor via a bus interface and configured to store programs and data used by the processor when performing operations; and
a transceiver, configured to be controlled by the processor to receive and transmit data,
when the processor calls and executes the program and data stored in the memory, the user side device realizes following steps:
receiving through the transceiver a discovery signal in a channel in an unlicensed frequency band, wherein the discovery signal is transmitted when a base station determines that the channel in the unlicensed frequency band is idle; and
discovering a cell of the base station based on the discovery signal;
wherein the receiving the discovery signal in the channel in the unlicensed frequency band comprises:
receiving discovery signal indication information which indicates whether the discovery signal is transmitted in the channel in the unlicensed frequency band; and
receiving the discovery signal in the channel in the unlicensed frequency band if the discovery signal indication information indicates the discovery signal is transmitted in the channel in the unlicensed frequency band;
determining whether the channel in the unlicensed frequency band is idle, based on a received power of the channel in the unlicensed frequency band;
wherein the determining whether the channel in the unlicensed frequency band is idle based on the received power of the channel in the unlicensed frequency band comprises:

determining whether the channel in the unlicensed frequency band is idle, by comparing a total received power of the channel in the unlicensed frequency band with a first threshold, wherein if the total received power is above the first threshold, the channel in the unlicensed frequency band is not idle, and if not, the channel in the unlicensed frequency band is idle; or determining whether the channel in the unlicensed frequency band is idle, by comparing a received power of a non-LTE signal in the channel in the unlicensed frequency band with a second threshold, wherein if the received power of the non-LTE signal is above the second threshold, the channel in the unlicensed frequency band is not idle, and if not, the channel in the unlicensed frequency band is idle; or determining whether the channel in the unlicensed frequency band is idle, by comparing a received power of an LTE signal in the channel in the unlicensed frequency band with a third threshold, wherein if the received power of the LTE signal is above the third threshold, the channel in the unlicensed frequency band is idle, and if not, the channel in the unlicensed frequency band is not idle; or determining whether the channel in the unlicensed frequency band is idle, by comparing a received power of a signal of an operator other than a Present operator in the channel in the unlicensed frequency band with a fourth threshold, wherein if the received power of the signal of the operator other than the present operator is above the fourth threshold, the channel in the unlicensed frequency band is not idle, and if not, the channel in the unlicensed frequency band is idle; or determining whether the channel in the unlicensed frequency band is idle, by comparing a received power of an LTE signal of an operator other than the present operator in the channel in the unlicensed frequency band with a fifth threshold, wherein if the received power of the LTE signal of the operator other than the present operator is above the fifth threshold, the channel in the unlicensed frequency band is not idle, and if not, the channel in the unlicensed frequency band is idle.

17. The user side device according to claim 16, wherein the receiving a discovery signal in a channel in an unlicensed frequency band comprises:

receiving discovery signal indication information which indicates whether there is a discovery signal transmitted in the channel in the unlicensed frequency band; and receiving the discovery signal in the channel in the unlicensed frequency band in response to the discovery signal indication information indicating there is a discovery signal transmitted in the channel in the unlicensed frequency band.

* * * * *